United States Patent [19]

Vallejos

[11] 4,201,174
[45] May 6, 1980

[54] ROTARY VALVE SYSTEM FOR MOTORS AND THE LIKE HAVING IMPROVED SEALING MEANS

[75] Inventor: Tony E. Vallejos, Paramount, Calif.

[73] Assignee: Alto Automotive, Inc., Deerfield, Ill.

[21] Appl. No.: 870,921

[22] Filed: Jan. 19, 1978

Related U.S. Application Data

[63] Continuation-in-part of Ser. No. 801,634, May 31, 1977, Pat. No. 4,119,077, which is a continuation-in-part of Ser. No. 653,195, Jan. 28, 1976, Pat. No. 4,098,238.

[51] Int. Cl.² .............................. F01L 3/00; F01L 1/28
[52] U.S. Cl. .................. 123/188 B; 123/79 R; 123/81 B; 123/190 R; 123/190 B; 308/5 R
[58] Field of Search ............ 123/79 R, 79 A, 80 R, 123/80 BA, 81 R, 81 B, 81 C, 188 B, 188 C, 190 R, 190 B, 190 BB, 190 BD, 190 E; 137/237, 238; 251/212; 308/5 R, DIG. 1

[56] References Cited

U.S. PATENT DOCUMENTS

| | | | |
|---|---|---|---|
| 1,273,002 | 7/1918 | Samuels | 123/188 B |
| 1,476,359 | 12/1923 | Ford | 123/79 |
| 1,492,587 | 5/1924 | Toth | 123/188 B |
| 1,902,130 | 3/1933 | Keister | 123/79 R |
| 1,924,188 | 8/1933 | Hall | 123/190 BB |
| 2,575,394 | 11/1951 | Rice | 308/5 R |
| 2,874,686 | 2/1959 | Carey, Jr. | 123/81 R |
| 3,277,696 | 10/1966 | Gertel | 308/5 R |
| 3,439,960 | 4/1969 | Guyon et al. | 308/5 R |
| 4,119,077 | 10/1978 | Vallejos | 123/188 B |

FOREIGN PATENT DOCUMENTS

| | | | |
|---|---|---|---|
| 246353 | 5/1912 | Fed. Rep. of Germany | 123/188 B |
| 371496 | 3/1923 | Fed. Rep. of Germany | 123/188 B |
| 443757 | 10/1912 | France | 123/188 B |
| 246287 | 1/1926 | United Kingdom | 123/188 B |

*Primary Examiner*—Ronald N. Lazarus
*Assistant Examiner*—Jeffrey L. Yates
*Attorney, Agent, or Firm*—Garrettson Ellis

[57] ABSTRACT

A rotary valve system for a motor and the like includes a flow conduit and rotary valve means interposed in the flow conduit. Intermittent sealing means are provided for preventing flow through the flow conduit, comprising a sealing surface intermittently positionable in stationary, sealing relationship across the conduit. Means are also provided for moving the sealing surface into such stationary sealing relationship with the flow conduit, and out of sealing relationship with the flow conduit in a manner correlating with the operation of the rotary valve means, to facilitate sealing as the valve operates.

19 Claims, 21 Drawing Figures

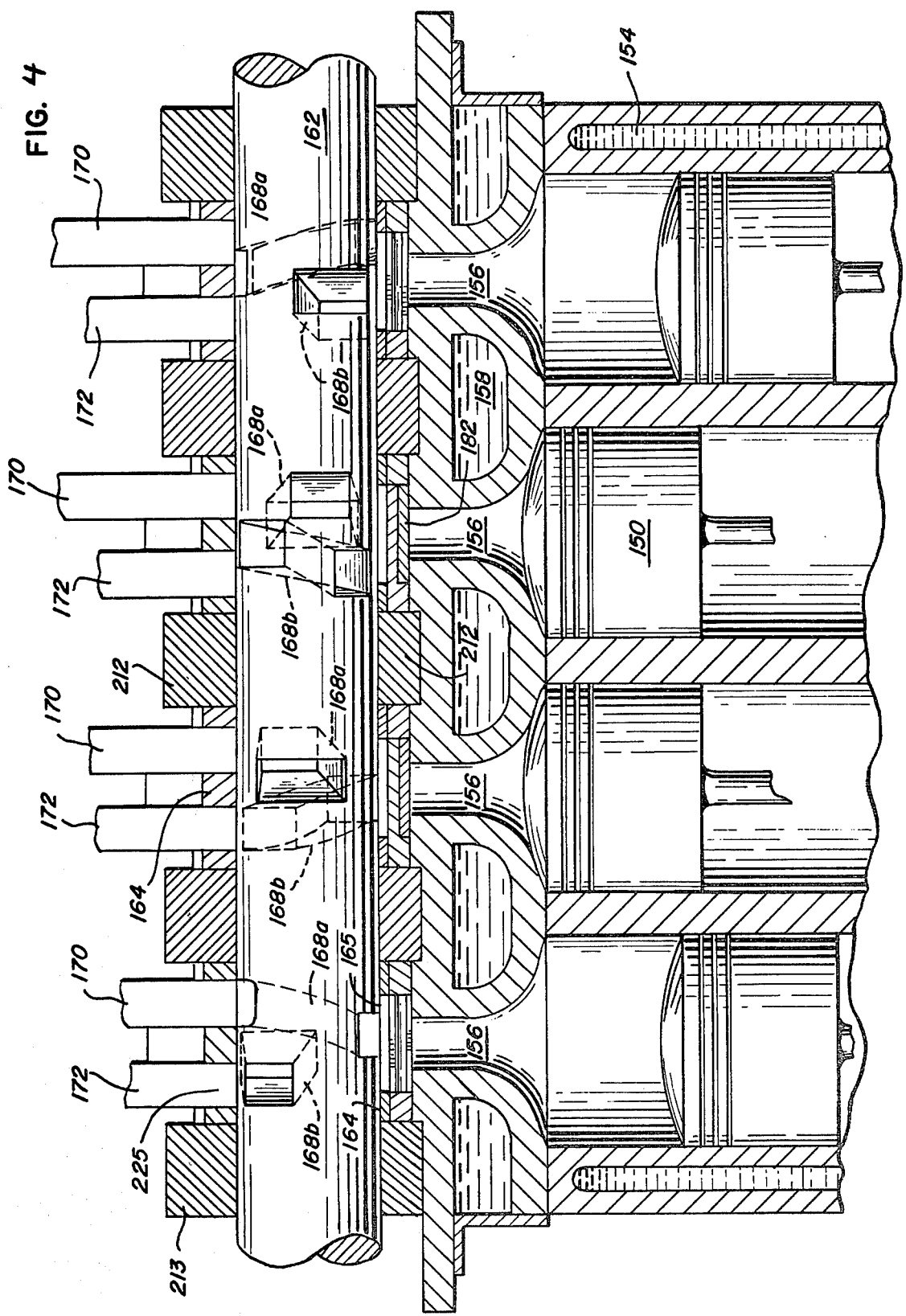

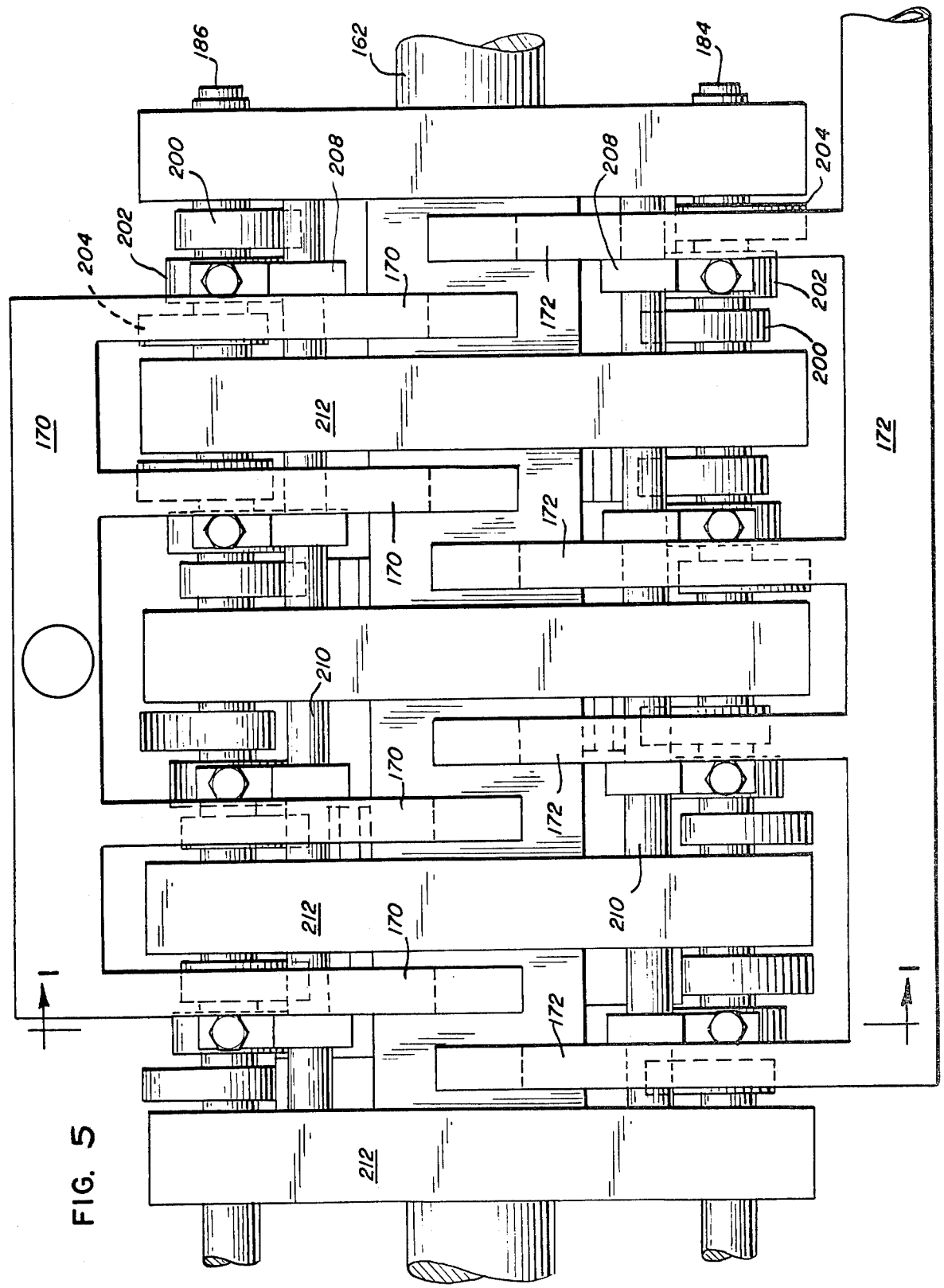

ROTARY VALVE SYSTEM FOR MOTORS AND THE LIKE HAVING IMPROVED SEALING MEANS

CROSS-REFERENCE TO RELATED APPLICATION

This application is a continuation-in-part of the U.S. application Ser. No. 801,634, filed May 31, 1977, now U.S. Pat. No. 4,119,077, which in turn is a continuation-in-part of U.S. application Ser. No. 653,195, filed Jan. 28, 1976, now U.S. Pat. No. 4,098,238.

BACKGROUND OF THE INVENTION

In the search for improvements in the operation of internal combustion engines, many attempts have been made to replace the conventional poppet valves of an engine cylinder with rotary valves. One such attempt is illustrated in U.S. Pat. No. 1,692,396. Another, more recent, engine design utilizing rotary valves is shown in an article by David Scott, relating to a cruciform engine, beginning on page 78 of the July, 1975 issue of *Popular Science*.

These, however, are merely exemplary of the hundreds of patents and articles relating to the use of rotary valves in engines.

Rotary valves have been considered to have significant advantages over the conventional poppet valves for an engine cylinder because they can operate more rapidly, reducing the problem which can be found in high speed poppet valve engines, in which the poppet valve actually can tend to run behind the remainder of the engine, the valve return springs being inadequate to cause them to keep up with the operation of the engine at an extremely high RPM rate.

Furthermore, in many designs of rotary valves, a single port, functioning as both fuel inlet and exhaust gas outlet, can be provided to the combustion cylinder. This reduces the extremely high temperatures of the exhaust valve in a conventional poppet valve engine, reducing the problems of preignition and detonation.

Rotary valves also provide an open, unobstructed flow path into and out of the combustion chamber, which greatly improves the flow efficiency of fuel vapors and exhaust, and permits a substantial reduction of valve overlap, when both the intake and exhaust valves are open during the operation of the engine. This, in turn, can be expected to contribute to a significant increase in the low speed efficiency of the engine.

Rotary valves also require less energy to operate than poppet valves, increasing the energy output of the engine.

However, despite the various significant potential advantages that a rotary valve system can be expected to have in an internal combustion engine, they have not come into commercial use, largely because rotary valves tend to leak if they are loose enough to permit free rotation, but they may seize if they are tight enough to contain the combustive pressures generated in the combustion chamber. To date, there appears to have been proposed no effective way to seal rotary valves in such a manner that the leakage of fuel vapors and exhaust gas is prevented to such a degree over the long term that the commercialization of a motor using a rotary valve system would be feasible.

In accordance with this invention, a rotary valve system having an auxiliary sealing mechanism is provided, particularly for sealing of the combustion chamber during compression and combustion states of motor operation.

As a result, the rotary valve itself no longer has to perform a significant sealing role against the pressures of the combustion chamber, but may simply work as a metering device for fuel and exhaust gas at relatively ambient pressures. Thus, the problem of rotary valve seizing can be eliminated, since the critical sealing functions are provided by other means.

Thus, the many advantages of the rotary valve may be utilized in motors designed in accordance with this invention.

Furthermore, a novel lubrication system for the valve of this invention is provided which preferably utilizes air, and is believed to simultaneously contribute to the reduction of unburned hydrocarbons in the exhaust, and to sweep clean the valve area.

The invention of this application also permits the location of the spark plug in an optimum location to provide a clean burn in the cylinder at a high compression with a stable flame front, for added efficiency. The engine has also been found to be extraordinarily quiet in operation.

DESCRIPTION OF THE INVENTION

In this invention, a rotary valve system for a motor and the like is provided, including a flow conduit for fuel and exhaust, and rotary valve means interposed in the flow conduit.

In accordance with this invention, intermittent sealing means are provided for preventing flow through the flow conduit. These intermittent sealing means comprise a sealing surface intermittently positionable in stationary, sealing relationship across the conduit. Also, means are provided for moving the sealing surface into the aforesaid stationary, sealing relationship with the flow conduit, and out of such sealing relationship with the flow conduit, in a manner correlating with the operation of the rotary valve means, to provide intermittent sealing at appropriate moments as the valve operates.

Accordingly, when the rotary valve utilized in this present invention occupies a position to block the flow of material to or from the combustion chamber, the intermittent sealing means can be adapted to occupy its stationary, sealing relationship across the flow conduit, typically at the entrance to the combustion chamber, to seal the chamber. When the rotary valve means is in open position, to either inject fuel vapors into the combustion chamber or to permit the withdrawal of exhaust gas, the intermittent sealing means is adapted to be out of sealing relationship with the conduit, to permit communication through the rotary valve into or out of the combustion chamber. Thus, as the valve rotates to alternatingly open and close the fuel inlet and exhaust gas outlet, the intermittent sealing means can also be moved back and forth into corresponding open and sealing positions as the function of the motor dictates.

One particular advantage of this present invention lies in the fact that the intermittent sealing means provides a stationary seal of the combustion chamber, while the rotary valve may at the same time continue in constant rotary motion during the operation of the engine. A stationary seal between unmoving surfaces results in much less wear of the sealing parts, when compared with a seal involving relatively moving surfaces. Also, a stationary seal can provide more effective high pressure sealing. This results in greater sealing reliability and life of the sealing parts.

Preferably, a rotary valve system for a motor and the like is provided, in which the motor has a combustion chamber, fuel inlet and exhaust outlet means communicating with the combustion chamber, a shaft, and rotary valve means operated by the shaft and controlling flow through the inlet and outlet means. In accordance with this invention, sliding valve means are positioned to control flow through the inlet and outlet means between the rotary valve and combustion chamber. The sliding valve preferably comprises first and second sliding plates positioned together in facing, overlapping relationship.

The first and second sliding plates each define an aperture. The plates are movable between a first sliding position in which the apertures overlap to define a flow path through the plates, and a second sliding position in which the apertures are spaced from each other to prevent flow through the plates. Arm means are attached to the sliding plates, and cam means on the shaft are positioned in engaging relation with the arm means, whereby rotation of the shaft reciprocates the plates between the first and second sliding positions in a manner correlating with the opening and closing of the rotary valves.

The sliding plates are preferably enclosed about their edges in a sealing cavity defined in a housing member. The width of the sealing cavity is greater, preferably essentially from 0.002 to 0.005 inch greater, than the combined thickness of the plates. The housing member defines a central aperture, so that the central portions of the sliding plates are exposed through the aperture to the exterior of the housing member.

The motor of this invention also preferably includes means for intermittently providing pressurized fluid between the sliding plates while moving from the second to the first position to facilitate the motion. In other words, the pressurized fluid, which is preferably air, aids in driving the sliding plates apart, particularly while moving from the closed to the open position in which the apertures align. Because the housing sealing cavity is slightly larger than the thickness of the sliding plates, this becomes possible. On the other hand, during the burning cycle of the particular cylinder, in which the sliding plates provide sealing valving, the pressure in the combustion chamber presses a sliding plate against the outer face of the cavity about its periphery in the sealed position, which increases the sealing effect.

Preferably the pressurized fluid providing means includes flow aperture means passing through the first sliding plate to provide flow communication between the space between the facing, sliding plates and air injection means for providing air as a pressurized fluid. Since the sliding plates are pushed apart by the air in at least the critical portions of their motion, and ride on a blanket of air, little or no oil is necessary to lubricate the plates which, in turn, reduces oil discharge into the exhaust.

It is also preferable for means to be provided for fluid flow communication between the air injection means and the face of the first, upper sliding plate which is opposed to the second sliding plate and the combustion chamber, to provide pressurized fluid to the opposed face to facilitate sliding of the face in the cavity of the housing, particularly to facilitate the motion from the second to the first position of the sliding plates.

The air injection means may be a piston and cylinder system adapted to operate in correlation with the moving of the sliding plates, or a pressurized air injector unit.

The arm means which operate the first and second sliding plates may comprise a pair of arms each attached to a separate plate at a central portion thereof, with the arm means connecting through the sliding plates by passing through the central aperture. Accordingly, the sealing cavity defined in the housing may be a closed, unbroken groove to provide uniform and complete sealing about the periphery of the sliding plates.

The connection between the arm means and the sliding plates may comprise stud means on each of the sliding plates and the arm means, plus intermediate connector means between the arm means and the sliding plates defining recesses to receive the stud means, to lock each plate and its connected arm means against relative motion with respect to each other in the direction of motion between the first and second positions, but to permit relative motion between each plate and its connected arm means in direction perpendicular to the plate faces. This permits the small degree of vertical motion which is allowed by the extra width of the groove in the housing, so that the plates may be driven apart by the air lubrication system, and then forced back together when in closed position by the pressure from the combustion chamber.

Accordingly, a stationary seal of high efficiency may be intermittently provided on the port or ports leading to the combustion chambers of a motor during, for example, the combustion phase of the engine, while the rotary valve may at the same time continue in constant rotary motion during operation of the engine. A stationary seal between unmoving surfaces results in much less wear in the sealing parts when compared with the seal involving moving surfaces. Also, a stationary seal can provide more effective high pressure sealing, which results in greater sealing reliability and life of the sealing parts.

Typically, several rotary valve systems as described above may be positioned in linear array, and operated by a common control shaft means which may particularly be a camshaft as described above. Also the several rotary valves in this linear array of rotary valve systems may all be defined by a single rotatable shaft member, for simplicity of construction of motors in accordance with this invention, and for permanently determining the proper operating sequence of the various valve systems.

This invention may be utilized with many types of internal combustion engines, four-cycle single and mutli-cylinder and diesel engines. The invention is preferably used in conjunction with motors in which a single port is used for both the inlet and outlet to the combustion chamber. It may also be used in other types of motors, as well as in other high pressure fluid handling apparatus besides motors.

In the drawings,

FIG. 4 is a longitudinal vertical sectional view taken on a line perpendicular to the sectional view of FIG. 3.

FIG. 5 is a top plan view of FIGS. 1 through 4.

Figure 1:
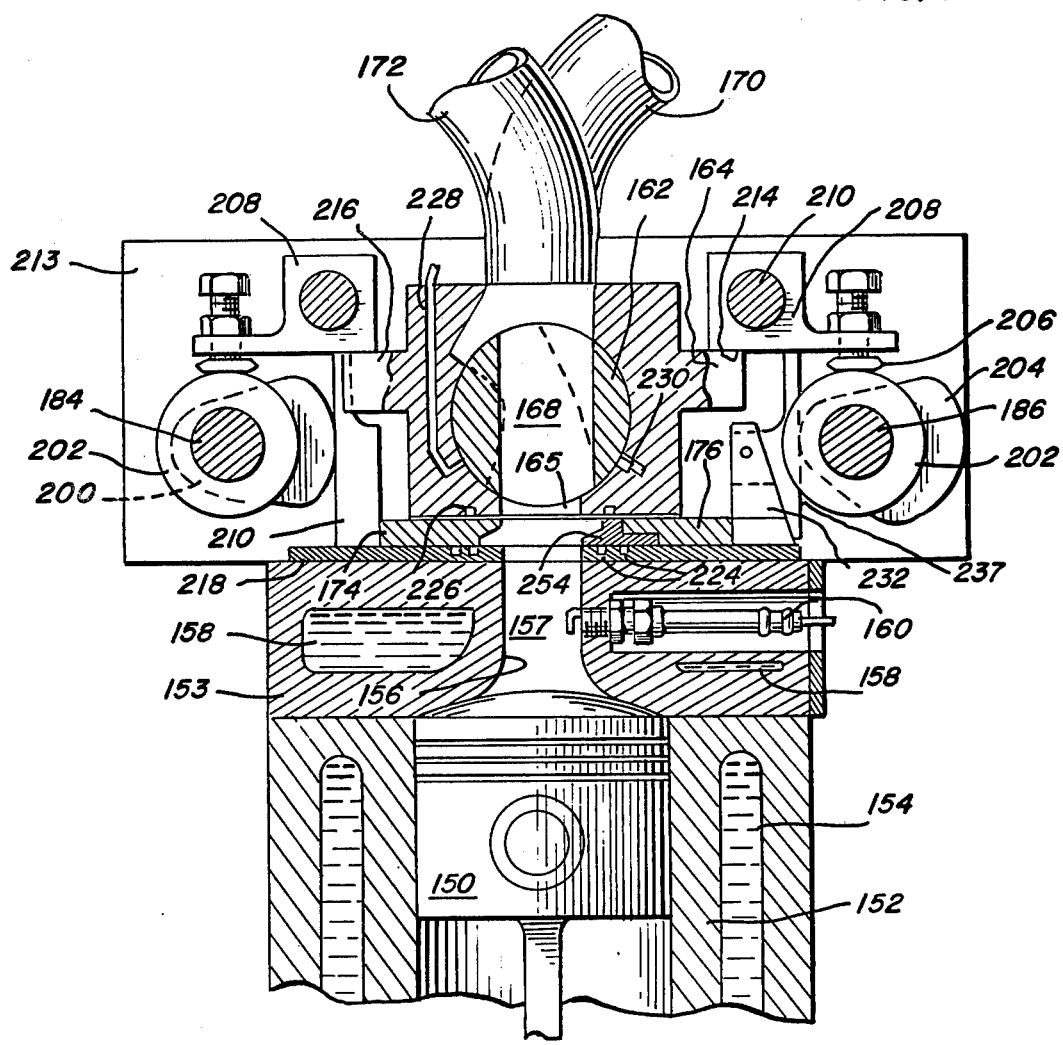
FIG. 1 is a transverse vertical sectional view taken through the embodiment of the motor as illustrated in FIG. 5 with the valve plates in the open position.

Referring to FIGS. 1 through 10, the apparatus utilizes broadly similar principles of structure and operation to the embodiment shown in the U.S. Pat. application Ser. No. 653,195 cited above, except as otherwise indicated herein.

A conventional piston 150 reciprocates in a cylinder 152 which preferably contains flow channels 154 around the cylinder for providing a flow of cooling water, to lower the operating temperature of the engine. The upper portion of cylinder 156 may, as in the previous embodiment, be constricted to provide the advantages described previously. Constricted portion 156 of the cylinder may also define water flow channels 158 for cooling, and laterally mounted spark plug 160 in a spark plug well as in the previous embodiment.

Rotary valve 162 is provided for a function similar to that previously described. Valve 162 is positioned as previously in valve housing 164 which housing loosely fits about valve 162. Housing 164 defines an aperture in which valve 162 fits, which is of slightly oval shape to permit upward and downward reciprocation of valve block 164 by a distance on the order of, preferably 0.005 to 0.015 inch.

Rotary valve 162, in turn, defines apertures 168 which communicate, respectively, with intake manifold 170 and exhaust manifold 172 in a conventional manner of operation for rotary valves.

Figure 1A:
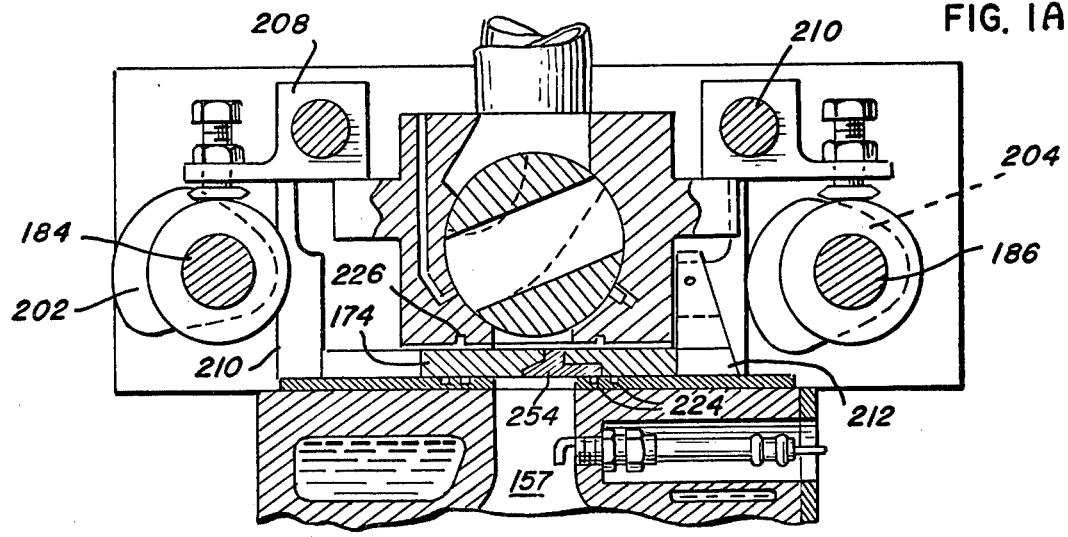
FIG. 1A is a fragmentary sectional view, similar to FIG. 1, but with the valve plates in the closed position.
Figure 2:
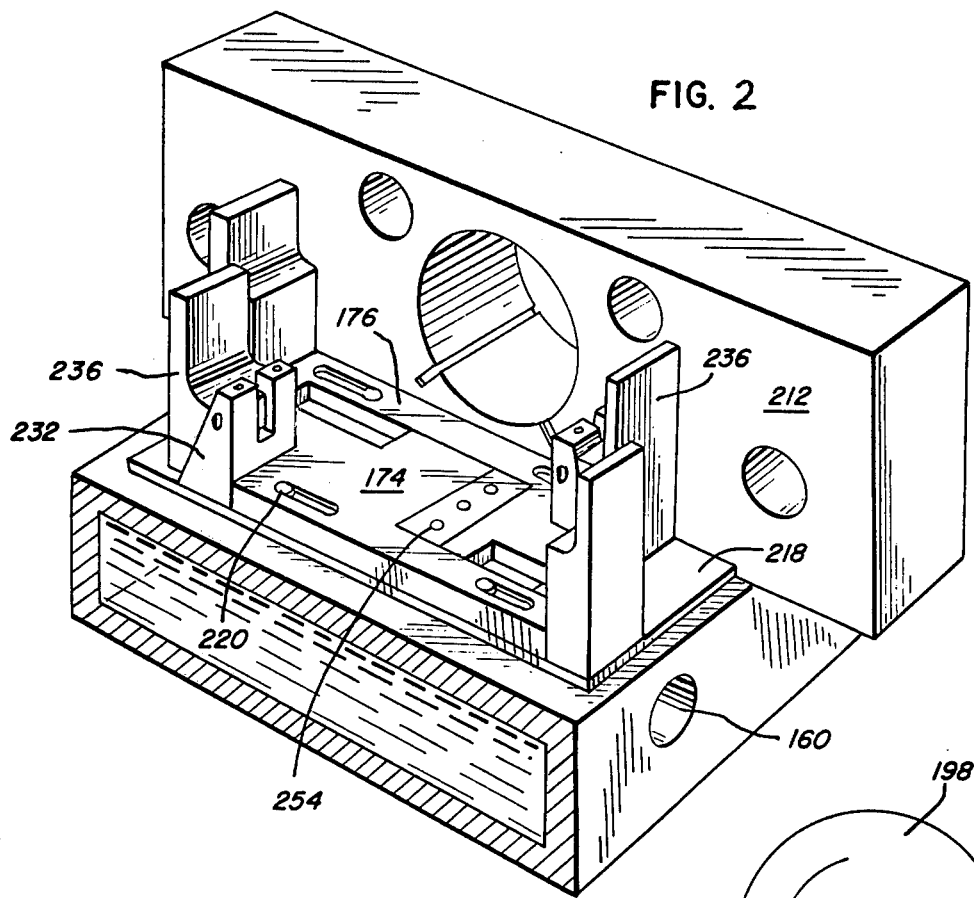
FIG. 2 is a fragmentary perspective view of a portion of the motor of FIG. 1 with valve plates shown in a closed, rather than in an open position.
Figure 6:
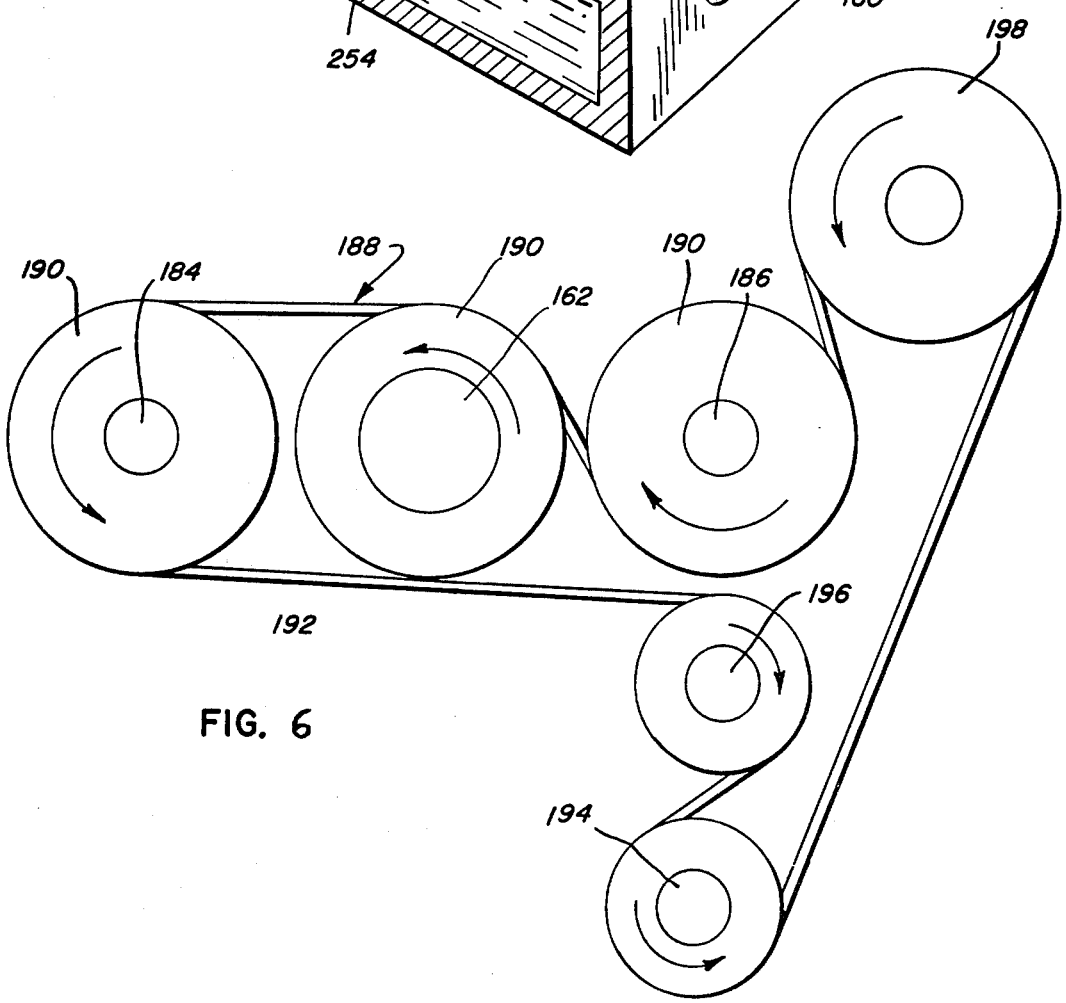
FIG. 6 is an elevational view of the means for connecting the various rotating parts of the engine of FIGS. 1 through 5 to rotate in synchronous manner.

A sliding valve assembly positioned between the opening 157 of constricted cylinder portion 156 of the combustion chamber and valve block 164 is defined by a pair of reciprocating valve plates 174, 176, which serve as a replacement for valve plate 34 in the previous embodiment. Valve plates 174, 176 each define a parallel sealing edge 178, 180 with the valve plates 174, 176 being positioned so that the parallel sealing edges abut each other in sealing relationship when the valve plates 174, 176 are in a first position, as shown in FIGS. 1A and 2, to define a sealing surface 182 to close off the upper end 157 of the combustion chamber.

Figure 3:
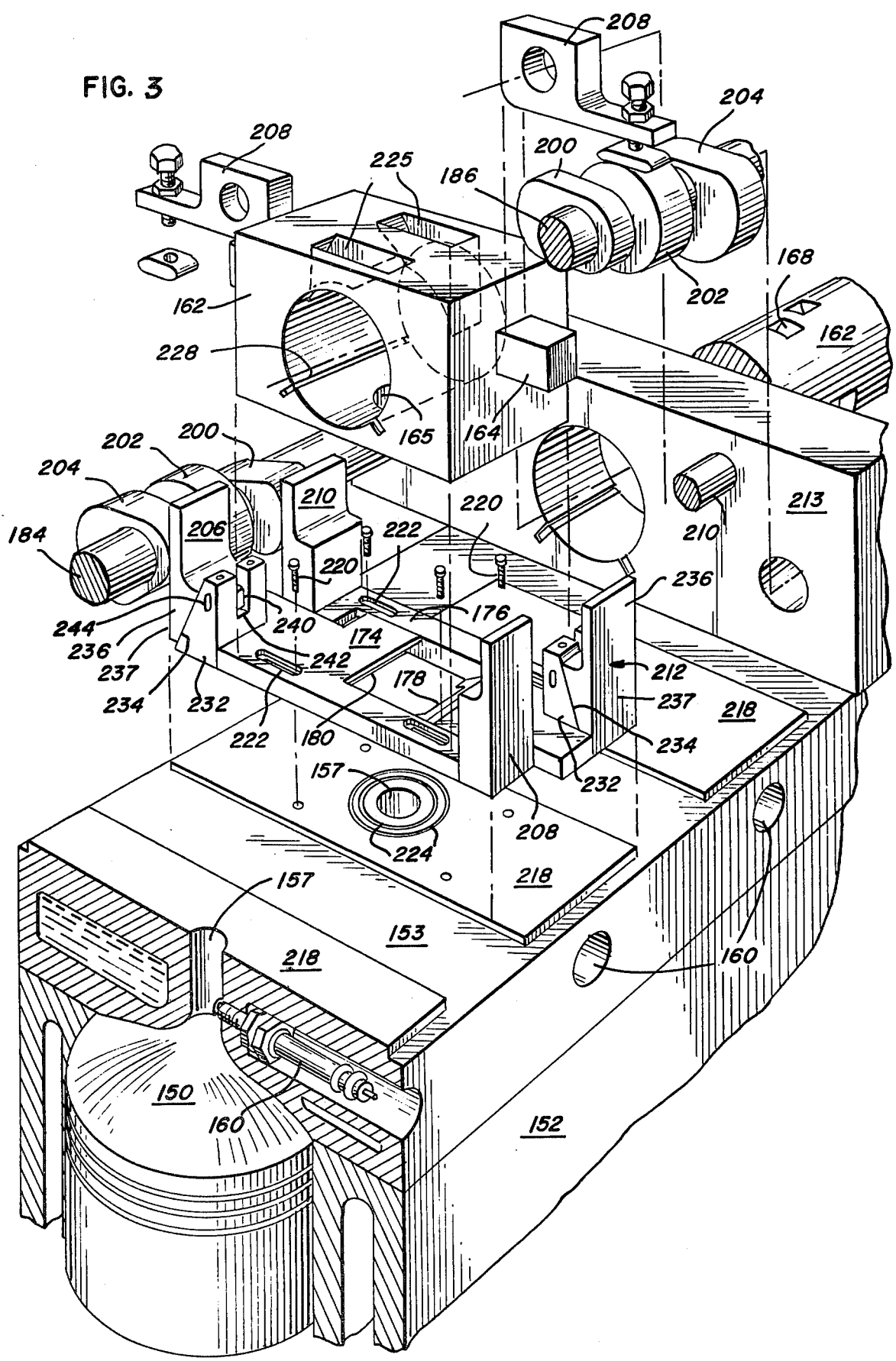
FIG. 3 is an exploded perspective view of the motor of FIGS. 1 to 10.

Valve plates 174, 176 can move in directions opposite to each other into a second position as shown in FIGS. 1 and 3 to define an open aperture through which fuel may be taken in through intake manifold 170 and valve 162, and through which exhaust gas may be expelled through the same rotary valve 162 and exhaust manifold 172.

The motion of valve plates 174, 176 is governed by a pair of rotatable camshafts 184, 186 which are adapted to be in synchronous rotation with valve 162 by belt and pulley system 188, which may be positioned at the front or back of the engine adjacent the ends of the respective shafts. In the embodiment shown, camshafts 184, 186 each carry a pulley 190. Rotary valve 162 also carries a pulley 190. Belt 192 is threaded about the respective pulleys 90 as well as a pulley on crankshaft 194 and two idler pulleys 196, 198. Accordingly, the entire system operates in synchronous rotation, driven by the crankshaft 194.

Each camshaft 184, 186 carries three cams for each cylinder utilized in the motor: cams 200, 202 and 204. Cams 200, 204 respectively bear against cam followers 206, 208, 210 and 212 on the ends respectively of plates 174, 176. In each respective camshaft 184, 186, cams 200, 204 are in reversed position to the corresponding cams on the other camshaft as shown so that each set of cams 200, 204 positioned on opposite camshafts cooperates to push each plate 174, 176 back and forth between the camshafts to open and close the valve aperture between the plates, as the plates move in opposite directions between the first and second positions.

As in the previous embodiment, plates 174, 176 are positioned in their first position during the compression and ignition phases of the motor operation, then moving by the action of opposing sets of cams 200, 204 to the second, open position as shown in FIGS. 1 and 3 for the exhaust and intake phases of the motor operation. Thereafter, cams 200, 204 are proportioned to move plates 174, 176 back into their first, sealing position for a new compression and exhaust phase in the engine cycle.

It can be seen that cams 200, 204 perform a function generally similar to cams 48 and 50 in the previous embodiment, although by a different form of mechanical action.

Cams 202 are also opposed to each other on their respective camshafts, and perform a function which is analogous to cams 74, 76 in the previous embodiment. The cams define an off-center circumference of, preferably about 0.015 inch. Bearing member 206 slides against the periphery of each cam 202, being retained by lever arm 208 which is adapted for pivoting about pivot shaft 210, each of which is mounted in pillow blocks 212 by passing through apertures thereof.

Accordingly, as camshafts 184, 186 rotate, cams 202 are positioned so that their longer radius portion engages bearing member 206 while valve plates 174, 176 are in their first, closed position, during the compression and combustion phases of the engine cycle. Levers 208 are accordingly raised on the side adjacent cams 202, and lowered on sides 214, pressing on ears 216 of block 164 to force valve block 164 downwardly against the closed valve plates 174, 176. This facilitates the sealing of the combustion chamber at its upper end 157, as in the previous embodiment.

When bearing member 206 is elevated by cam action about 0.015 inch, valve block 164 is lowered by approximately 0.005 inch, with about a threefold mechanical advantage, to provide a desired firm pressure against valve plates 174, 176, to prevent leakage of combustion products.

Immediately thereafter, as the shorter radius portion of cam 202 rotates into contact with bearing 206, the downward pressure on valve block 164 by lever arms 208 is released, to allow valve plate members 174, 176 to move from their first to their second positions for opening the combustion chamber, and then to permit the valve plate members to close once again, prior to reapplication of the pressing force of valve block 164 through the action of cams 202.

Valve plate members 174, 176 may be retained on valve plate bed 218 by bolts 220, which are retained in slots 222. Valve plate bed, in turn is carried by the upper surface of the upper cylinder block 153.

Figure 7:
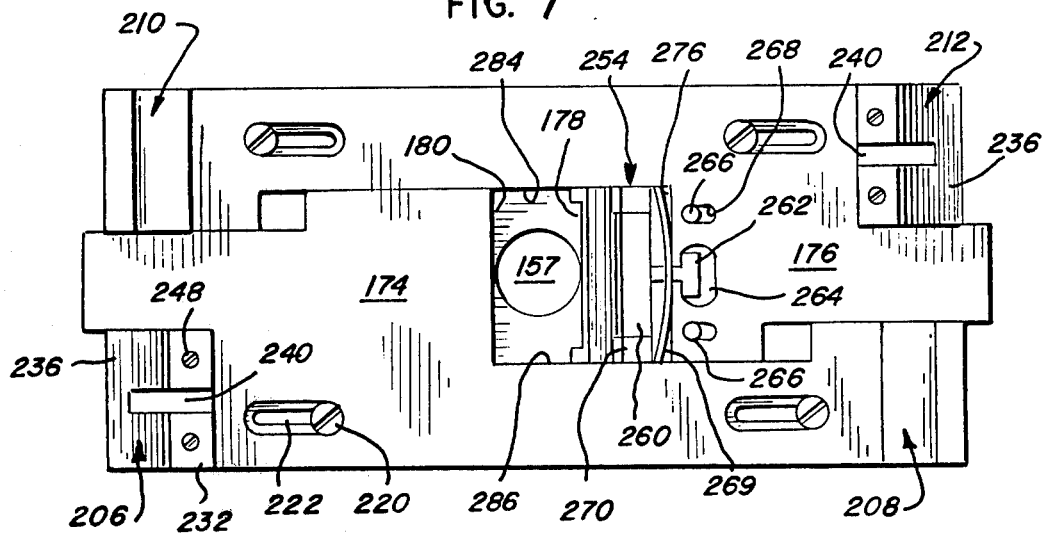
FIG. 7 is a top plan view of the valve plates otherwise shown in FIG. 10.

Slot 222 may have beveled edges as shown in FIG. 7 so that bolts 220 rest flush within the slot.

The upper end of combustion chamber 157 exits through valve plate bed 218, being surrounded by one or more annular seals 224, which may be constructed in the manner of auxiliary sealing system 94 as previously disclosed above.

FIG. 4 shows a typical arrangement for the exhaust manifolds 172 and the intake manifolds 170 for a four-cylinder engine utilizing the invention of this application, and having the firing order of the previous engine. The apertures 168a on rotary valve 162 which provide access between intake manifolds and cylinder chambers 156 are shown as indicated. Channels 168b provide communication between exhaust manifolds 172 and chamber 156, as can be seen. Manifolds 170, 172 communicate with rotary valve rod 162 through apertures 225 in valve block 164. The flow path is then completed through aperture 165 in the bottom of valve block 164.

An upper annular seal 226 is defined in the lower surface of valve block 164 to provide additional sealing of the interface between the valve block and valve plates 174, 176. Seal 226 may be constructed in a manner similar to that of seals 224.

Oil entry port system 228 is similar to the system of the previous embodiment, except that oil line may be pressure-fed in conventional manner. Scraper blade 230 is provided in a manner similar to member 141 in the previous embodiment to remove excess oil from portions of the rotary valve 162 before exposure to combustion chamber 156 (in this embodiment, as in FIG. 1, rotary valve 162 rotates clockwise).

Other conventional oil lubrication systems may be used in the motor of this invention.

As in the previous embodiment, the embodiment of FIGS. 1 through 9 can be lubricated by free-falling lubricant, falling on and around valve block 164 and camshafts 184, 186. By this, the sliding surfaces adjacent and on valve plates 174, 176 can be lubricated as well. Alternatively, more sophisticated pressurized lubrication systems can be provided in any manner desired.

At least one of the cam followers of each sliding valve plate 174, 176 is a multi-part system to permit adjustment of the length of each valve plate 174, 176 to fit the needs of the particular system, to adjust for wear, and the like.

Figure 8:
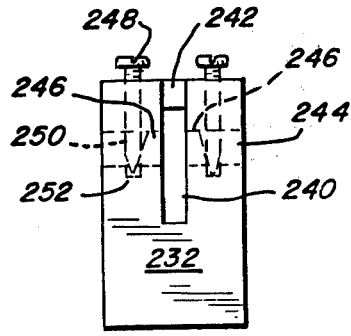
FIG. 8 is a transverse sectional view of a cam follower assembly attached to the valve plates.

As shown in FIG. 8, each of cam followers 206, 212 comprises an inner member 232 which is attached to its respective plate 174 or 176. Inner member 232 defines an angle other than perpendicular to the plane of the respective plate members 174, 176. An outer member 236 defines a typically flat cam contact surface 237 for contact with its mating cam 204 (or cam 200 as the case may be).

Outer member 236 also defines an inner surface positioned against and parallel to the upstanding end face 234 and correspondingly indicated by that reference numeral as well. Accordingly, movement of outer member 236 upwardly or downwardly along the sliding surfaces 234 correspondingly causes cam contact surface 237 to move inwardly or outwardly to change the overall length of each plate member 174, 176. This permits the adjustment of the plate members by a few thousandths of an inch as necessary to optimize the functioning of the engine.

FIG. 8 shows the retention mechanism utilized for holding outer member 236 in a fixed position with respect to inner member 232. Outer member 236 defines a projection 240 which fits in slot 242 of inner member 232. Inner member 232 also defines a side port 244 which passes through slot or aperture 242. Positioned within side port 244 are a pair of gripping pads 246, positioned to bear against and grip projection 240, impelled by the pressure of tapered bolts 248. The tapered surfaces 250 of bolts 248 drive pads 246 inwardly against projection 242 as bolts 248 are advanced into bolt holes 252, for retention of outer member 236.

To facilitate the sealing between edges 178, 180, one of the parallel sealing edges 178 is defined by a sliding member assembly 254. Assembly 254 comprises a first sliding member 256, as part of plate member 176, and having a forward edge 258. A second sliding member 260 is carried by the first sliding member and defines sealing edge 178, adapted for sealing contact with the other sealing edge 180 of plate member 174. The second sliding member is relatively movable in the direction of motion between the first and second positions of plates 174, 176, being retained in plate 176 by the loose fitting of retainer lug 262 of upper sliding member 260 in enlarged aperture 264 of plate member 176.

Pins 266 are carried by lower member 256, and are positioned in slots 268 of sliding valve plate 176 for retention of lower member 256 with valve plate 176.

Spring seals 269 are provided, comprising an arcuate spring member terminated at its ends with enlarged sealing members 270, and positioned at the rear of upper member 260. Lower member 256 also carries a similar spring seal member 272, which is terminated with sealing members 274 and positioned at the rear of lower member 256. Spring member 272 is adapted to bear against a lower portion of plate member 176, while spring seal 268 bears against edge 276 of plate member 176.

Figure 10:
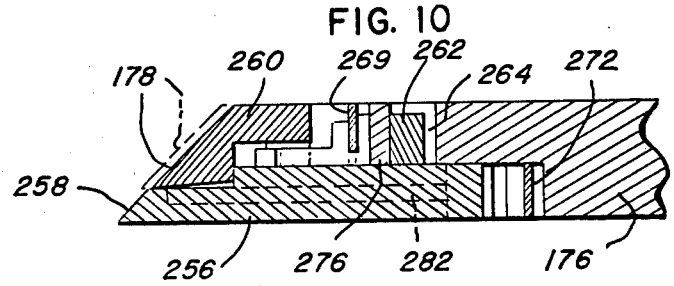
FIG. 10 is a sectional view taken along line 10—10 of FIG. 9.

Accordingly, when the valve plate members 174, 176 are being moved in opposite directions into the first, sealed position where edges 178 and 180 mate together in a sealed closure over the upper end 157 of the combustion chamber, the apparatus is so proportioned that the sliding member assembly 254 is pushed into closed position with edge 180 through projection 262 and related parts, to cause the second sliding member 260 to move relatively forwardly with respect to the first sliding member 356, to cause edge 178 to project slightly forwardly of edge 258, as shown in dotted lines in FIG. 10. This projecting edge forms the seal with edge 180.

Simultaneously, the same closing action causes plates 176 to bear against spring seals 269, 272, correspondingly causing sealing projections 270, 274 to spread outwardly to a slight degree, providing a side seal for sliding member assembly 254 in the first position of the sliding members. As camshafts 184, 186 continue to rotate, and plates 174, 176 begin to move to the open position, the pressure on spring seals 269, 272 is released, causing the side seals 270, 274 to retract laterally inwardly, releasing the side seals. Then, as valve plates 174, 176 begin to move in opposite directions to each other from the first sealing position into the second, open position, projection 262 is pulled by the walls of aperture 264 in plate 176 to cause the entire sliding member assembly 254 to move away from the opening 157 of the combustion chamber. As an initial motion, first sliding member 260 is withdrawn to its position shown in full lines in FIG. 10, shielding the edge 178 from the full effects of the blast of exhaust gas being emitted through the open end of combustion chamber 157.

This process repeats itself over and over again throughout the movement of valve plates 174, 176, to provide significant increase in the sealing capability of the motor of this invention over conventional rotary valve systems.

Figure 9:
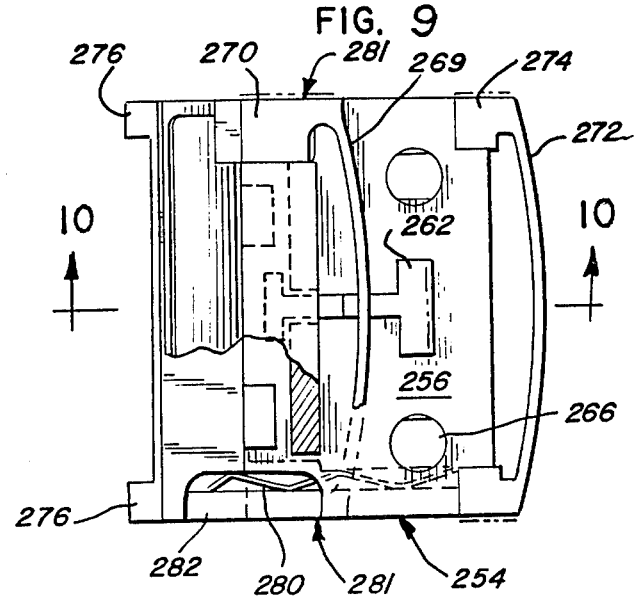
FIG. 9 is an enlarged plan view, with parts broken away, of part of a plate member as shown in FIG. 7.
Figure 11:
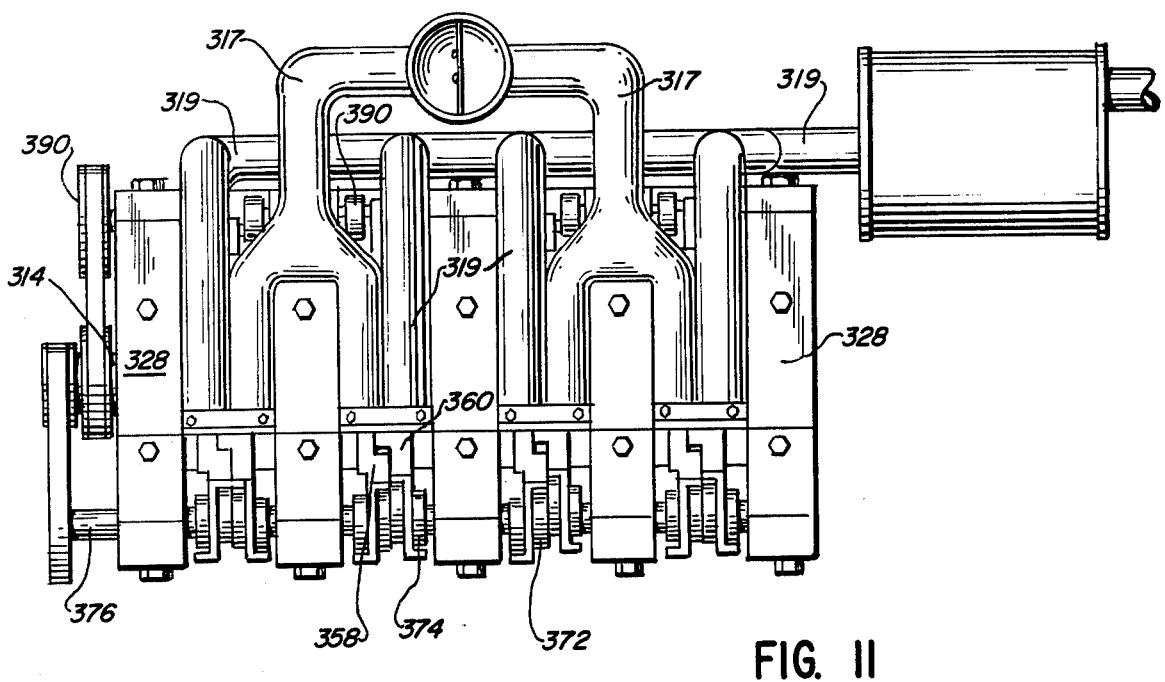
FIG. 11 is a plan view of an improved and preferred embodiment of the motor of this invention.

Additional sealing features of sliding member assembly 254 include projections 276 on first or lower sliding member 256, as well as side seals 281 on both sides of first sliding member 256, one of which is illustrated in FIG. 9 by broken away portions and phantom lines. A wave spring 280 is positioned in a slot behind a flat seal bar 282 which, in turn bears, against side edges 284, 286 of valve plates 174, 176 for sealing.

Referring to FIGS. 11 through 20, the preferred motor of this invention is illustrated. Broadly, the overall principle is similar to the previous embodiment, in that a set of conventional pistons 300, reciprocating in cylinders 302 (FIG. 15), are utilized in the conventional manner of an internal combustion engine. Specifically, a four-cycle gasoline engine is illustrated, although, as before, the invention may be modified for use with diesel or other types of engines. The upper end of cylinder 302 is constricted to form a narrowed throat 304 into which a spark plug 306 resides, positioned in a well 308 of a cylinder head member 310. Throat member 304 communicates with a passageway 311 which passes through sliding valve member 312 into communication with a rotary valve 314, which may be similar to the rotary valve disclosed in the previous embodiment.

Rotary valve 314 communicates with an inlet port 316 and a manifold port 318, which in turn communicate respectively with an intake manifold 317 and outlet manifold 319, so that throat portion 304 alternatively communicates with the respective manifolds through passageways 320, 322 in rotary valve 314.

Wiper seals 324 are provided in valve block 326, as in the previous manner. However, valve block 26 may, in this embodiment, be stationary and unmoving, being attached to pillow blocks 328, which are positioned between the valve assemblies of the respective cylinders 302. Pillow blocks 328 may be bolted to the cylinder block by bolts 327.

As in the previous embodiment, cylinders 302 may also define water jacket flow passages 330 completely and circumferentially around the cylinder, and the head base 310 may also define water jacket apertures 330 as well.

The sliding valve means 312 is adapted to provide the main sealing function of throat 304 during compression and power strokes of the engine cycle, so that the sealing function of the rotary valve is only relatively secondary, the valve serving primarily to meter flow between the inlet and exhaust systems.

Sliding valve 312 includes first and second sliding plates 332, 334 positioned together one on top of the other in facing, overlapping relationship. Each sliding valve defines an aperture 336, 338, aperture 336 being larger than aperture 338 to receive studs 340 of second plate 334. Corresponding studs 342 of the first plate 332 are positioned on the upper side of the first plate.

Both valve plates 332, 334 define a U-shaped groove 346 about their peripheries. Apertures 348 are drilled through the bottom of groove 346 of the first plate 332, in the manner shown, to provide fluid flow communication between the respective grooves 346 through sliding plate 332.

Both sliding plates are positioned, one on top of the other, within aperture 351 defined in lower valve retention plate 352. The lower valve retention plate 352 is of a thickness which is slightly greater than the combined thickness of the two sliding valve plates 332, 334, preferably essentially from 0.002 to 0.005 inch greater, so that the sliding valve plates have a small amount of transverse "play" in aperture 351. Lower valve retention plate 352 is preferably a continuous member extending across all of the cylinders 302 of the engine, and defining an aperture 351 adjacent each throat member 304 of each cylinder.

Upper valve retention plate 354 is also a strip of metal which preferably extends across all of the cylinders, and is generally continuous in its extent with lower valve retention plate 352. Upper valve retention plate 354 also defines an aperture 356 positioned above each aperture 351 of the lower valve retention plate. Valve retention plates 352, 354 enclose sliding valves 332, 334. Aperture 356 is smaller in both its length and width than sliding valves 332, 334, and is preferably of essentially the same width as apertures 336 and 338, which are also preferably of the same width. Accordingly, sliding valves 332, 334 are captured in a chamber or cavity defined by valve retention plates 352, 354, resting upon head plate 310, but exposed to access through aperture 356.

One of the sliding plates 332, 334 may be made of graphited aluminum and the other of a lightweight steel alloy, to facilitate the sliding process, by lowering inertia load.

Sliding plate 332 is connected to arm 358, while sliding plate 334 is connected to arm 360. Arms 358, 360 are positioned above upper valve retention plate 354, and communicate through aperture 356 with the respective sliding plates by means of connector members 362, which may be squared, hollow tubular structures that fit respectively over studs 340, 342 at their bottom end, and fit into studs 364 projecting downwardly from each arm 358, 360, at their upper ends. This connects the arms and the sliding plates together for horizontal motion in the plane of the sliding valve plates. However, sliding plates 332, 334 are capable, because of this connection means, to move upwardly and downwardly in a manner perpendicular to the horizontal, planar direction of motion, within the small amount of clearance provided by the slightly increased thickness of lower valve retention plate 352.

Figure 16:
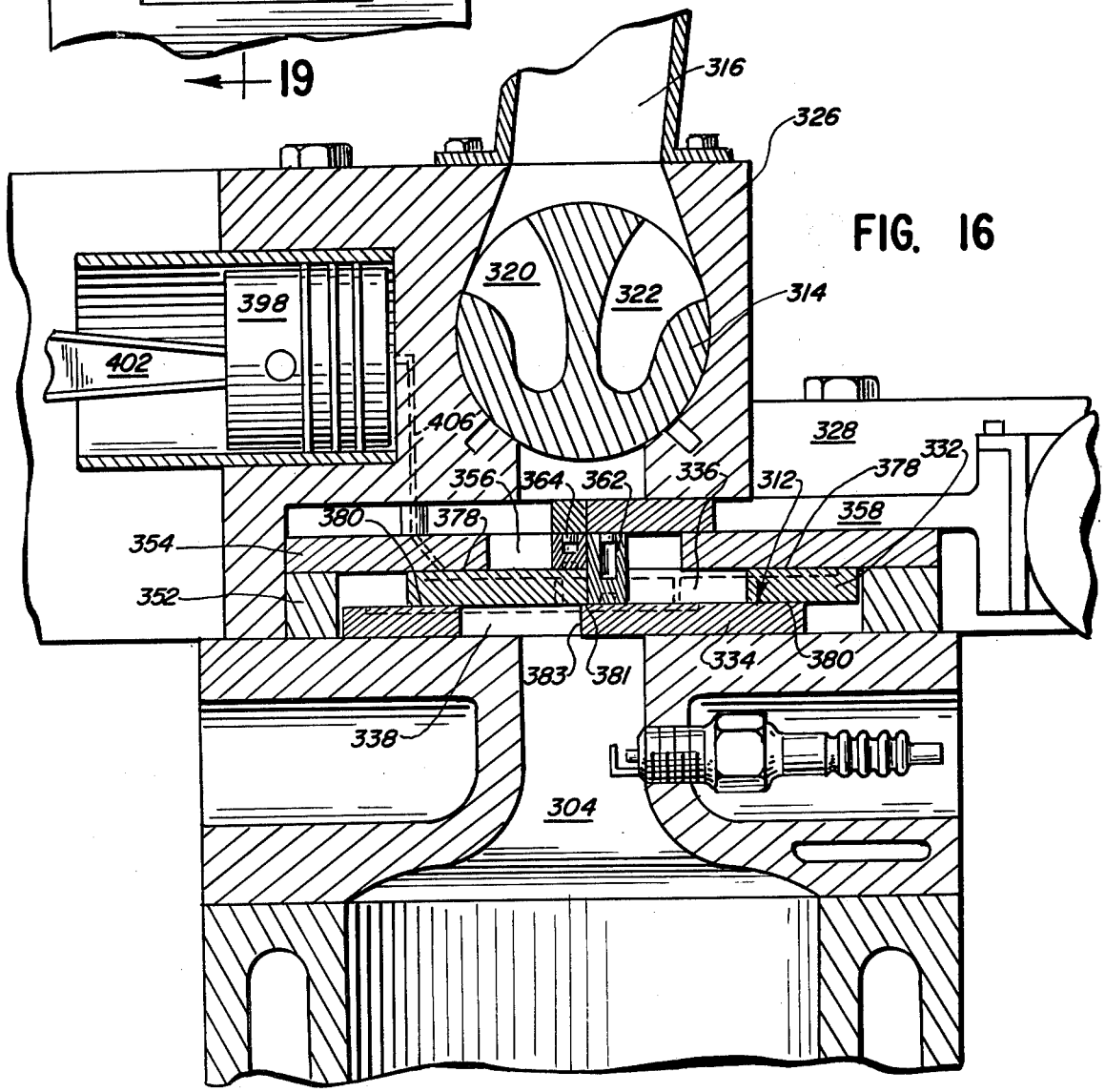
FIG. 16 is a longitudinal sectional view, similar to FIG. 15, showing the sliding valve system in closed position.
Figure 20:
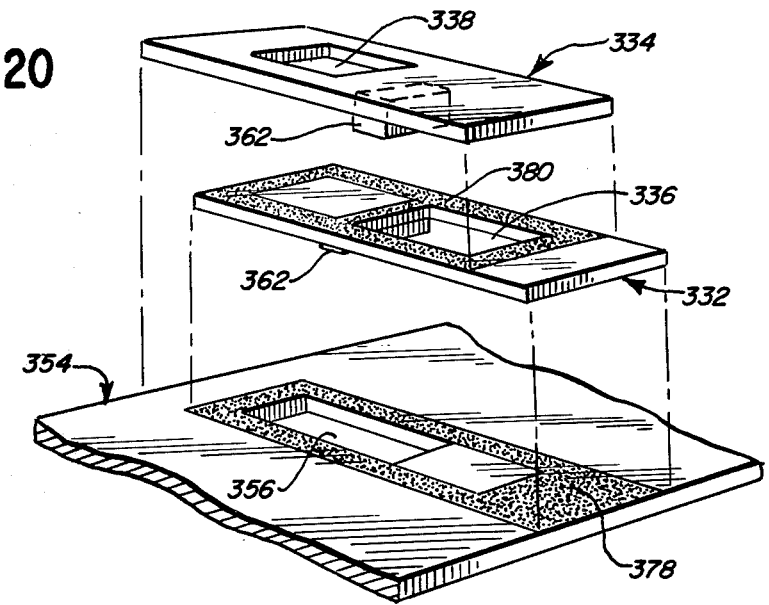
FIG. 20 is an inverted bottom perspective view showing the seal areas of the closed sliding valve of FIGS. 11 through 19.
Figure 19:
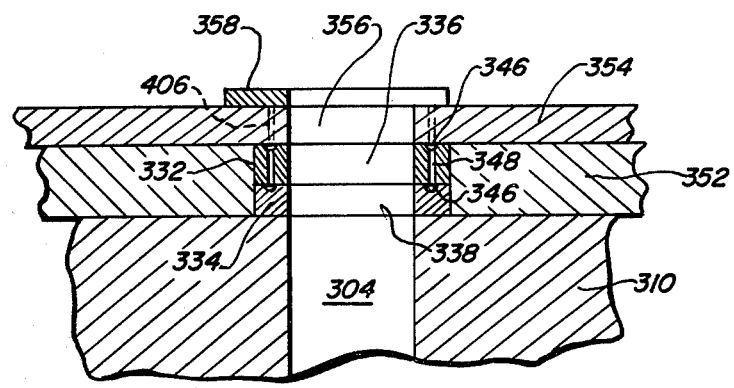
FIG. 19 is a highly enlarged, transverse sectional view along line 19—19 of FIG. 18 of the valve aperture of FIGS. 11 through 18.

Arms 358, 360, in turn, each carry cam follower members 366, including push plates 368 and pull plates 370, each adapted for engagement with seperate cams 372, 374 on a camshaft 376. Accordingly, as camshaft 376 rotates, arms 358, 360, and the connected valve plates 332, 334, reciprocate in opposite directions between a closed position in which apertures 336, 338 of the valve plates do not align, as shown in FIG. 16, and an open position in which the apertures 336, 338 of the valve plates are in alignment, as in FIG. 15, to permit flow communication between rotary valve 314 and throat 304 of the cylinder. The countermotion action of the respective valve plates is accomplished in a positive, desmodromic manner, without the usual valve springs which resist the valving action. Accordingly, the valving action can proceed with less consumption of energy than in a poppet valve system.

The orientation of camshaft 376 and the shape of the cams are so adapted that sliding valve 312 is in the closed sliding position during the compression and power phases of the engine operation. As the exhaust cycle of the engine begins, the cams on shaft 376 open the sliding valve 312 to permit the exhaust phase to take place, and they remain open during the intake phase of the engine cycle. Then, the cams on the rotation camshaft 376 once again push sliding valve 312 into the closed position.

Simultaneously with this, rotary valve 314 rotates to expose the ends of passages 320 and 322 to aperture 323 in valve block 326, to provide an open passageway between the respective manifolds 316, 318 and cylinder 302. While sliding valve 312 is closed, rotary valve is also adapted to be closed, as shown in FIG. 16.

While in the sealed position, sliding plates 332, 334 may be pushed upwardly by the small distance represented by the extra thickness of lower valve retention plate 352 by the pressure within throat 304 during the power phase of the cycle. This increased pressure causes particularly upper sliding plate 332 to press firmly against the underside of upper valve retention plate 354. Since aperture 356 is of generally similar width to aperture 336, a continuous area of sealing 378 is formed about the periphery of the underside of upper valve retention plate 354 and the upper sliding valve 332, as illustrated for example in FIG. 18 as well as in FIG. 16. Also, lower sliding valve plate 334 provides other sealing areas 380 against upper valve plate 332. For example, a sealing area 381 is formed as shown in FIG. 16 to the right of aperture 338 between sliding plates 332, 334, to seal contact line 381 between the two sliding members. This latter seal area may be at least about ⅛ inch in width, and is defined by projecting portion 383 of plate 334, which passes under plate 332 in the sealed position.

Accordingly, a series of pressure seal areas are provided, one between upper valve retention plate 354 and upper sliding valve 332, and another between upper sliding valve 332 and lower sliding valve 334, to provide a seal of increasing effectiveness upon an increase in pressure in the cylinder 302, since such an increase in pressure in turn forces the valve plates and the upper valve retention plate together with added pressure. Also, the large area of sliding valves 332, 334 multiplies the pressure of the valve seal created by pressure in the combustion chamber.

It should be also noted that upper valve retention plate 354, being a continuous strip, is retained in place by pillow blocks 328, which sit upon the valve retention plates 352, 354 and hold them in position.

Accordingly, a tight, almost hermetic seal can be provided by the flat, sliding valve plates 332, 334, acting against the upper valve retention plate 354, which has been found in operating of the actual prototype of this invention to be of very high order of efficiency.

The valve system of the embodiment shown in FIGS. 11 through 20 includes a novel pressurized gas lubrication system as a substitute for a conventional oil system. Typically, air is used to facilitate the motion of sliding plates 332, 334 to separate the plates as they move, particularly out of the closed into the open position within the cavity defined by aperture 351.

It is also contemplated that this air lubrication system can be used with other valving and mechanical systems, particularly in an environment where it is undesirable to utilize the usual amounts of oil. In this particular instance, any substantial amount of oil which is placed on the moving surfaces of valve plates 332, 334 may tend to be drawn into the exhaust of the engine, contributing to oil consumption and to the level of unburned hydrocarbons in the exhaust.

Figure 12:
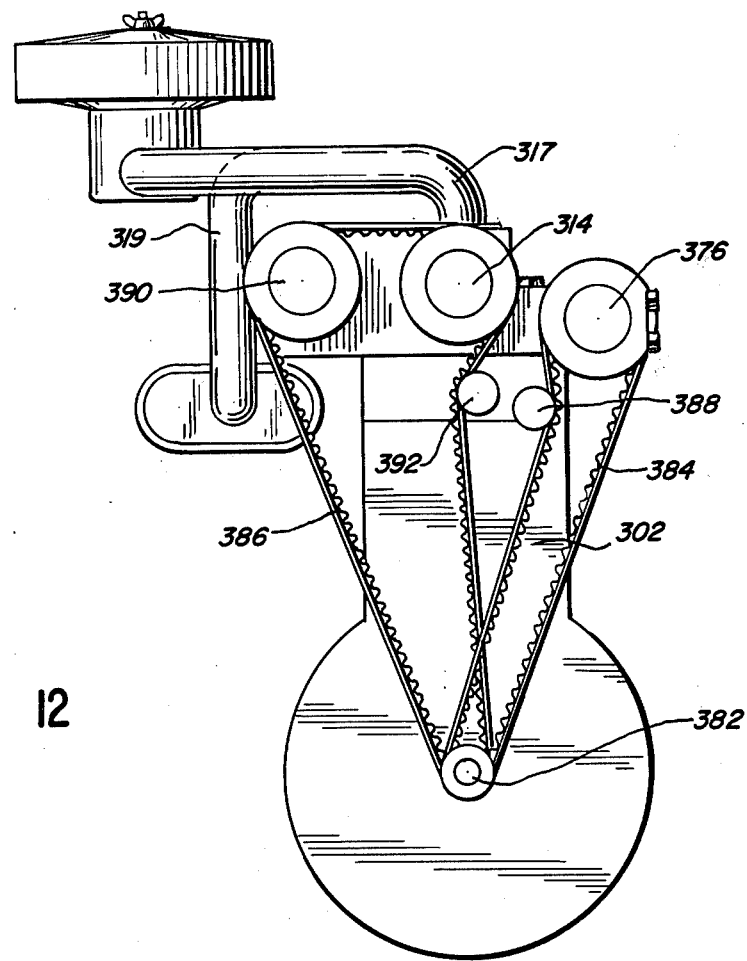
FIG. 12 is an elevational view taken from one end of the motor of FIG. 11.
Figure 13:
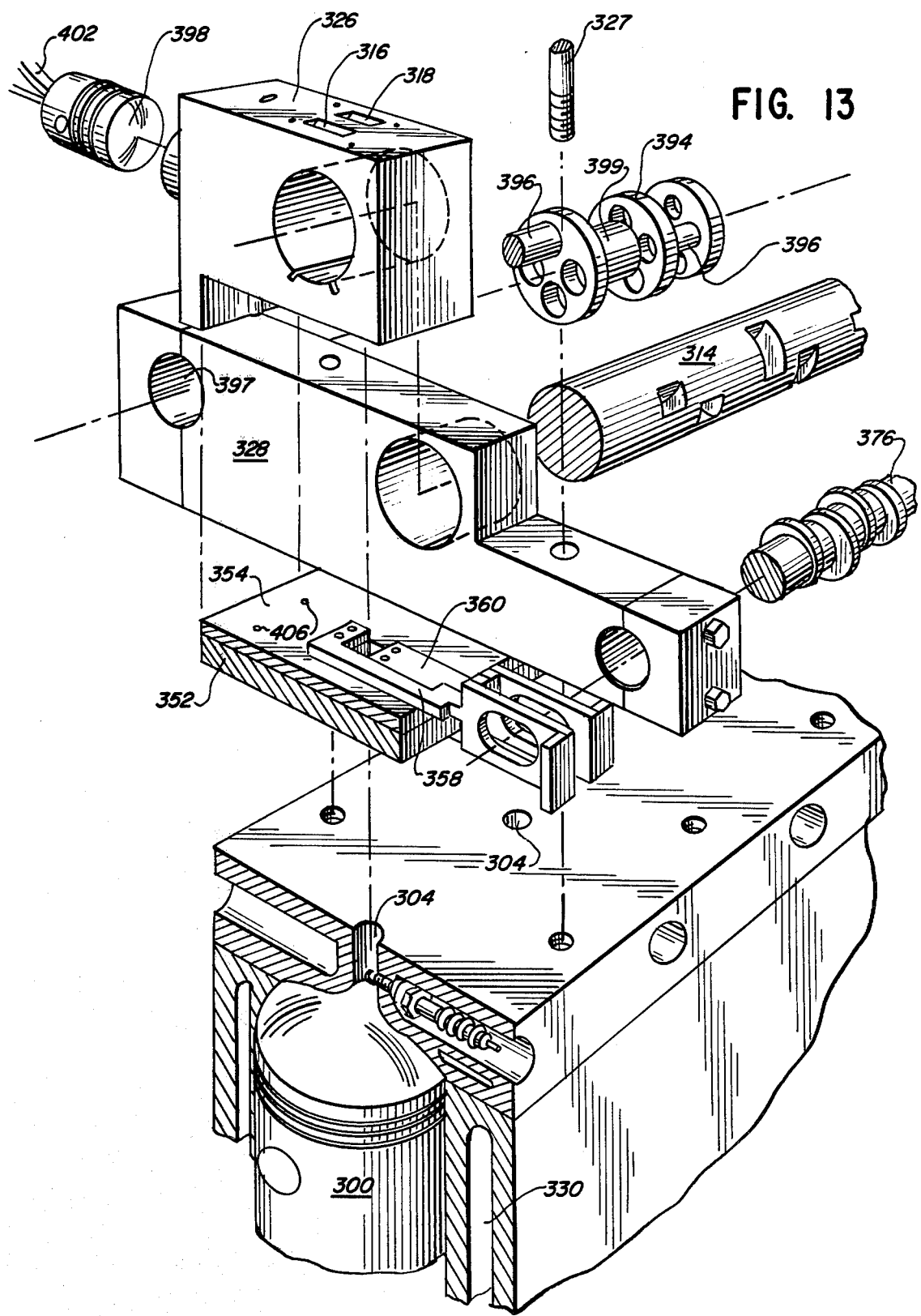
FIG. 13 is an exploded perspective view of a portion of the motor of FIG. 11 with some parts not shown for purposes of clarity.
Figure 14:
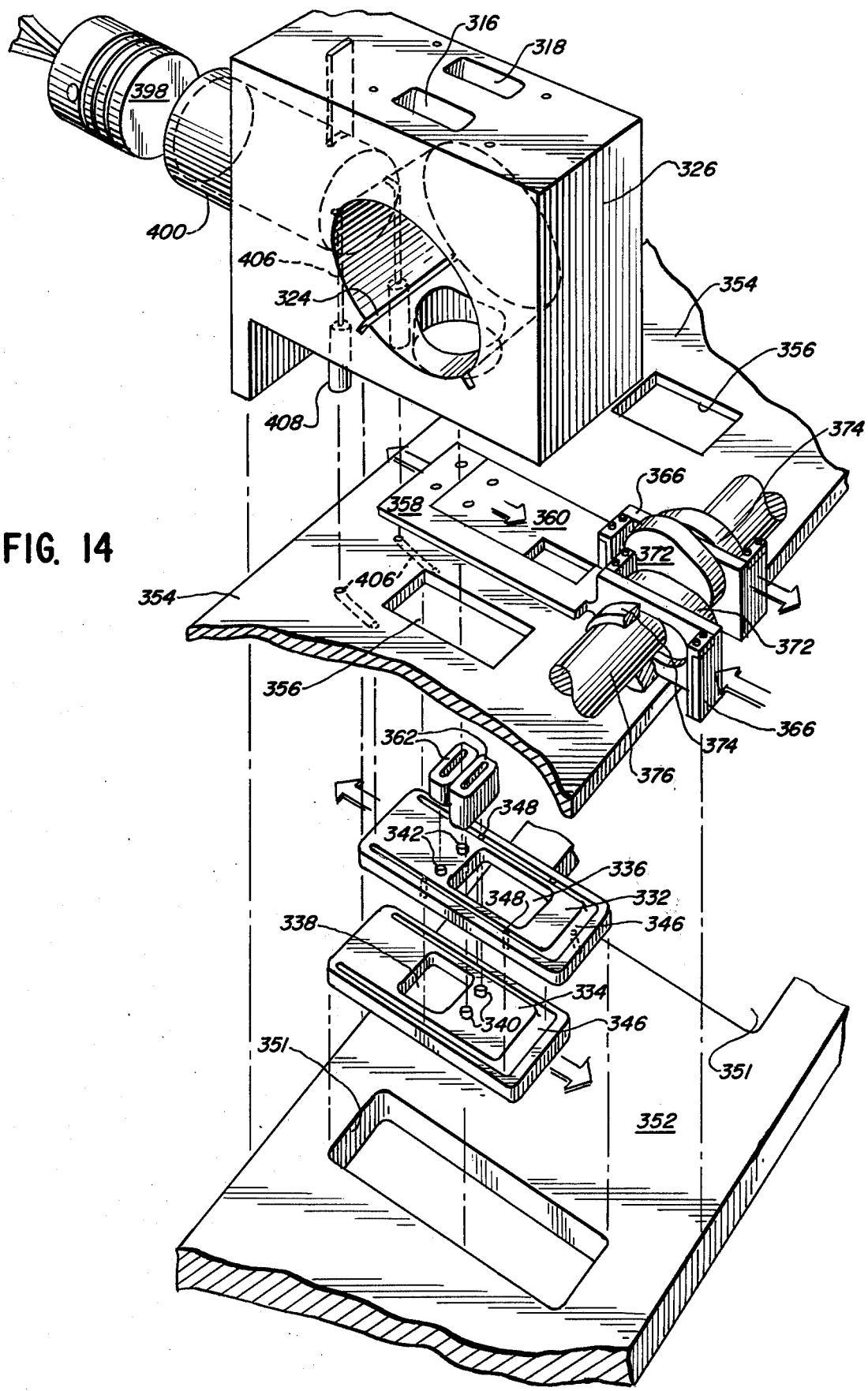
FIG. 14 is another exploded perspective view, enlarged with respect to FIG. 13, of the motor of FIG. 11, showing other parts and aspects of the invention, with some parts not shown for purposes of clarity.
Figure 15:
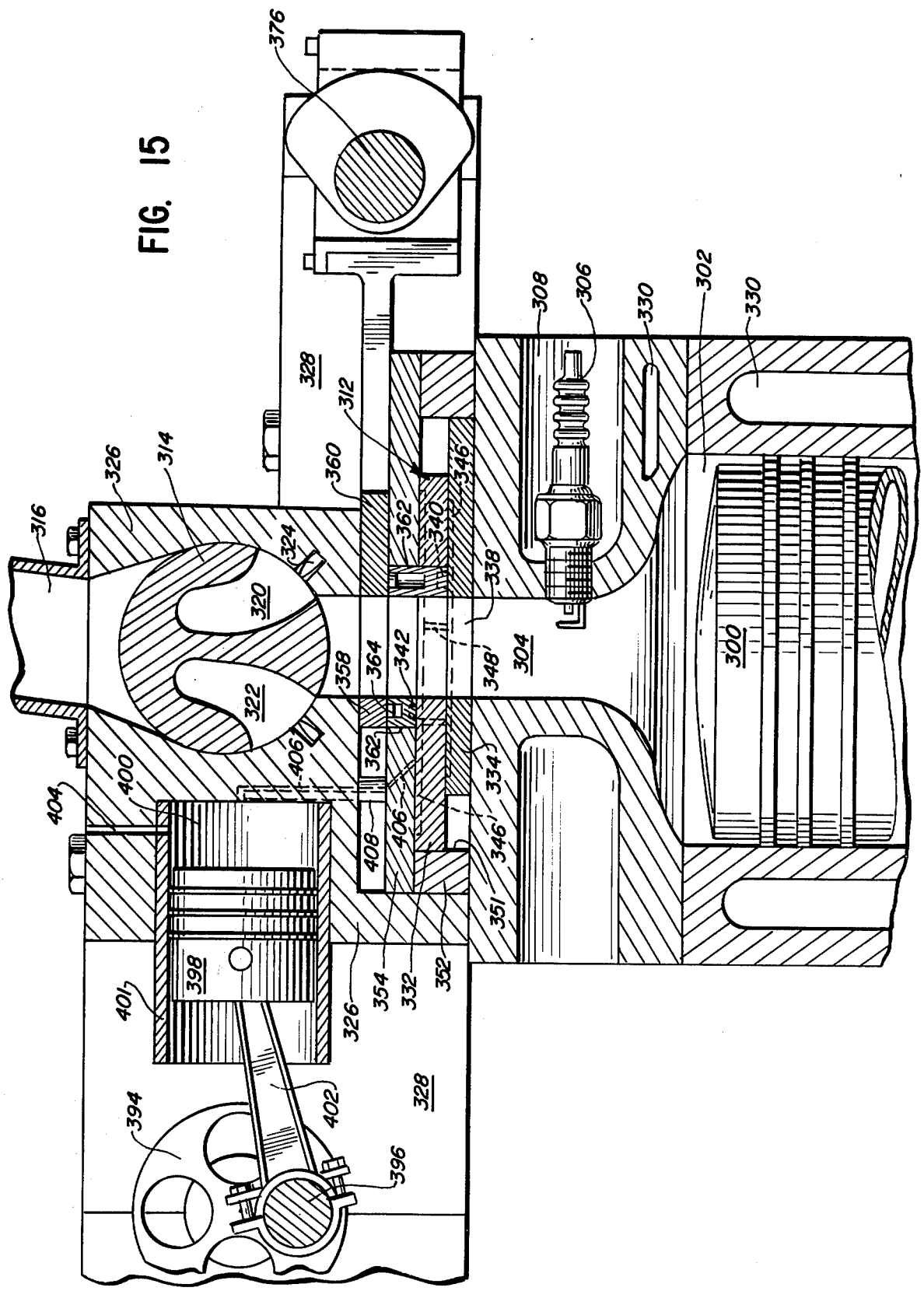
FIG. 15 is an enlarged, transverse sectional view of one cylinder and valve system of the motor of this invention, showing the sliding valve system in its open position.
Figure 17:
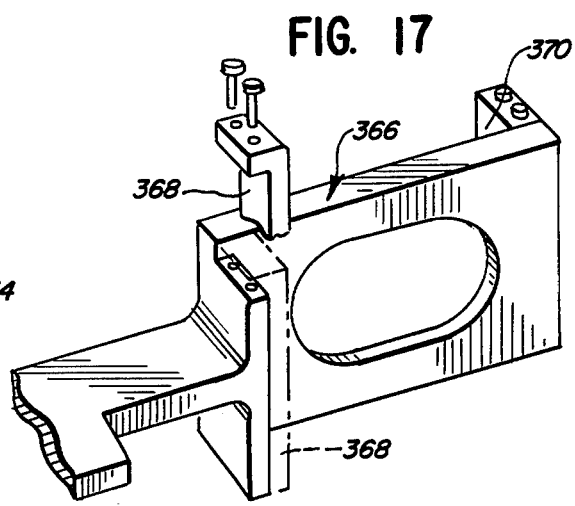
FIG. 17 is a fragmentary, perspective view of a cam follower member.
Figure 18:
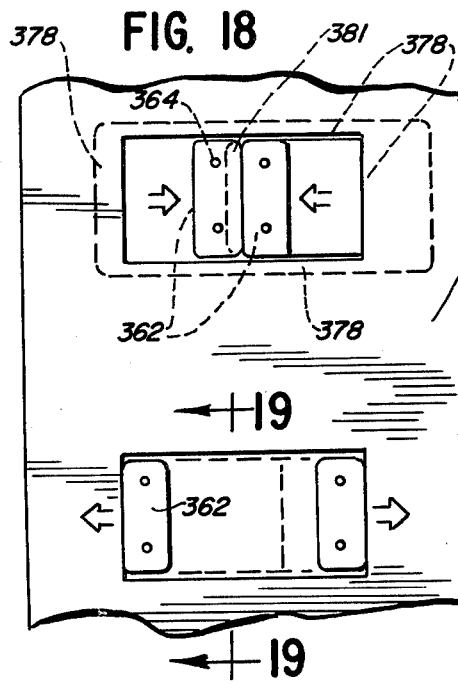
FIG. 18 is a fragmentary plan view of a pair of the sliding valves of this invention, with portions omitted for clarity.

FIG. 12 shows how the embodiment of the engine of this application may be linked together with conventional belts to synchronize the operation of the engine. Crankshaft 382 is connected with belt means, shown particularly in this embodiment to comprise a pair of belts 384, 386, although embodiments utilizing a single belt member are contemplated as well. Belt 384 connects crankshaft 382 with camshaft 376 and correlates their operation. Belt 384 also runs across idler 388.

Belt 386 connects rotary valve 314 and auxiliary crank 390 with crankshaft 382 to correlate their operation. Belt 386 also runs across idler 392 in conventional manner.

The circumference of the sprockets on crankshaft 382 which receive belts 384, 396 is one half that of the sprockets which carry the same belts on camshaft 376, valve 374, and auxiliary crankshaft 390, so that these latter members rotate once for every two rotations of the crankshaft.

Auxiliary crank 390 is shown as it is in the actual embodiment used in the initial model of this invention, but it is also contemplated that a conventional crankshaft may be utilized. Basically, auxiliary crank member comprises a series of perforated discs 394, connected together through the respective perforations by connecting rods 396, to provide a structure of crankshaft shape, in which the orientation of the cranks with respect to each other can be adjusted as desired by reemplacement of the connecting rods 396 in different apertures of the discs 394. Pairs of discs 394 are held together by central shaft 399, which is rotatably positioned in aperture 397 in pillow block 328.

An auxiliary piston 398 is positioned to reciprocate in a chamber 400, being connected to the auxiliary crank member 390 through piston rod 402 in a conventional manner.

Air bleed hole 404 provides communication with the exterior of the motor, hole 404 being positioned at a point spaced a small distance (for example one inch) from the inner end of piston chamber 400. Piston chamber 400 may be a bore in valve block 226, containing cylinder 401.

Passageway 406 communicates with the inner end of chamber 400 as shown, passing through valve block 326, and out of the lower surface of the valve block to an insert 408. From there, passageway 406 passes through upper valve retention plate 354, and is positioned to communicate with the groove 346 of sliding plate 332.

Accordingly, as piston 398 is reciprocated by the action of crank member 390, in correlation with the operation of crankshaft 382 and valve 314, the closing piston provides pressurized air to passageway 406 and bleed hole 404. When piston 398 has moved far enough inwardly of the chamber 400 to close bleed hole 404, highly pressurized air is provided to passage 406, causing the pressurized air to be squirted into groove 346 of upper sliding valve plate 332, and from there to pass through apertures 348 to enter into grooves 346 of the lower sliding valve plate 334. From there, the pressurized air exerts pressure against the seal areas between the upper side of the sliding plate 332 and upper valve retention plate 354, as well as also providing pressure to help break the seal between upper sliding plate 332 and lower sliding plate 334.

This action is correlated by proper timing of auxiliary crankshaft 390 to take place at the end of the power stroke, when it is desired to open sliding valve 312. By the surge of pressurized air passing into the system through passageway 406, the seal areas in sliding valve 312 are broken apart as valve plates 332, 334 move into their open position by the action of arms 358, 360, impelled by camshaft 376. After the valves are opened, the pressurized air is squirted into the open aperture leading to passageway 320 of the rotary valve and ultimately to the exhaust manifold 319, mingling with the exhaust gases. This provides additional oxygen for the oxidation of any unburned hydrocarbons, while also providing cooling action to the valve plates, and sweeping action to provide cleaning of the valve plates, as well as providing in effect a lubrication function for sliding valve plates 332, 334 in the essential absence of oil. If desired, small amounts of oil may also be provided to facilitate the lubrication.

Typically, auxiliary piston 398 may, in the operation of the motor of this invention, move into its top dead center position about 20 degrees of rotation of crankshaft 382 after the start of the opening event between sliding plates 332, 334. If it is desired to also provide a burst of air pressure against valve plates 332, 334 while moving from the open to the closed position, auxiliary crankshaft 390 can be adapted to rotate once for every single rotation of crankshaft 382.

Alternatively, piston 398 and the related apparatus can be replaced by any other desired apparatus for intermittently providing pressurized air to the system.

By means of the above embodiments of a sealing system, rotary valves can be utilized on a long-term commercial and reliable basis. As a result of this, the operating temperature of the engine can be drastically reduced, which, in turn, greatly reduces the amount of nitrogen oxide pollutants produced by the engine. Similarly, engines utilizing the invention disclosed herein can exhibit a great deal of power for their size, coupled with a good "drivability" since, by the use of rotary valves, valve overlap can be minimized. Rotary valves inherently provide much greater efficiency of intake and exhaust than poppet valves, since there is no poppet to impede the flow into and out of the combustion chamber. Also, the engine is expected to operate more efficiently, using low octane fuel if desired.

The above has been offered for illustrative purposes only, and is not for the purposes of limiting the scope of the invention of this application, which is as defined in the claims below.

That which is claimed is:

1. In a motor having a combustion chamber, fuel inlet and outlet means communicating with said combustion chamber through a single, common port coaxially located with said combustion chamber, a shaft, and rotary valve means operated in registry with said shaft, controlling flow through said inlet and outlet means and port, the improvement comprising, in combination: sliding valve means, positioned to control flow through the port between said rotary valve means and combustion chamber, comprising first and second sliding plates positioned together in facing, overlaping relationship and free of spring-biased pressure together, said first and second sliding plates each defining an aperture, said plates being movable between a first sliding position in which said apertures overlap to define a flow path through said plates and said port, and a second sliding position in which said apertures are spaced from each other to prevent flow through said plates and port; arm means attached to said sliding plates, and cam means on said shaft positioned in engaging relation with said arm means, and adapted to move said plates between first and second sliding positions and to allow said plates to remain stationary in said second sliding position, whereby rotation of said shaft reciprocates said plates between the first and second sliding positions in a manner correlating with the opening and closing of said rotary valve.

2. The motor of claim 1 which includes means for intermittently providing pressurized gas between said sliding plates while moving from said second to the first position, to facilitate said motion.

3. The motor of claim 2 in which said pressurized fluid providing means includes flow aperture means passing through said first sliding plate, air injection means for providing air as a pressurized fluid, said flow aperture means providing flow communication between said air injection means and the space between said facing sliding plates.

4. The motor of claim 3 in which means are provided for fluid flow communication between said air injection means and the face of said first sliding plate which is opposed to said second sliding plate, and the combustion chamber to provide pressurized fluid to said opposed face to further facilitate said motion from said second to the first position.

5. The motor of claim 4 in which said air injection means is a piston and cylinder system adapted to operate in correlation with the movement of said sliding plates.

6. The motor of claim 1 in which said sliding plates are enclosed about their edges in a sealing cavity defined in a housing member, the width of said sealing cavity being essentially from 0.002 to 0.005 inch greater than the combined thickness of said plates, said housing member defining a central aperture, the central portions of said sliding plates being exposed through said aperture to the exterior of said housing member.

7. The motor of claim 6 in which said arm means are connected to said first and second sliding plates at a central portion thereof, said arm means connecting with said sliding plates through the central aperture.

8. The motor of claim 7 in which said connection between the arm means and the sliding plates comprises stud means on each of said sliding plates and said arm means, and intermediate connector means between said arm means and sliding plates defining recesses to receive said stud means, to lock each plate and its connected arm means against relative motion with respect to each other in the direction of motion between the first and second positions, but to permit relative motion between each plate and its connected arm means in the direction perpendicular to said plate faces.

9. The motor of claim 8 in which one of said sliding plates is made of graphited aluminum and the other of said plates is made of a lightweight steel alloy.

10. The motor of claim 1 in which said cam means are adapted to simultaneously reciprocate said first and second plates in opposite directions while moving between said first and second sliding positions.

11. A valve system for a motor and the like which includes sliding valve means positioned to control flow through a fluid flow passage and rotary valve means also controlling flow through said fluid flow passage, said sliding valve system comprising first and second sliding plates positioned together in facing, overlapping relationship and free of spring-biased pressure together, said first and second sliding plates each defining an aperture, said plates being movable between a first sliding position in which said apertures overlap to define a flow path through said plates and a second sliding position in which said apertures are spaced from each other to prevent flow through said plates; said plates being enclosed about their edges in a sealing cavity defined in a housing member, the width of said sealing cavity being essentially from 0.002 to 0.005 inch greater than the combined thickness of said plates, said housing member defining a single central aperture, the central portions of said sliding plates being exposed through said aperture to the exterior of said housing member; arm means attached to said sliding plates; and means for reciprocating said arm means to cause reciprocation of said plates between the first and second sliding positions and means for correlating the operation of said rotary valve and sliding valve whereby both are simultaneously open and both are simultaneously closed during operation of the motor.

12. A valve system for a motor and the like which includes sliding valve means positioned to control flow through a single fluid flow passage, said sliding valve means comprising first and second sliding plates positioned together in facing, overlapping relationship, said first and second sliding plates each defining an aperture, said plates being movable between a first sliding position in which said apertures overlap to define a flow path through said plates, and a second sliding position in which said apertures are spaced from each other to prevent flow through said plates; arm means attached to said sliding plates, and means for reciprocating said arm means to cause reciprocation of said plates between the first and second sliding positions and to also allow said plates to remain stationary in said second sliding position, and further including means for intermittently providing pressurized gas between said sliding plates to facilitate said motion by separating said plates with pressurized gas as they move from the second to the first position, and to stop said provision of gas when the plates remain stationary in their second sliding position.

13. The valve system of claim 12 in which said pressurized gas providing means includes flow aperture means passing through said first sliding plate; air injection means for providing air as a pressurized gas, said gas aperture means providing flow communication between said air injection means and a space between said facing sliding plates.

14. The valve system of claim 13 in which said sliding plates are enclosed about their edges in a sealing cavity defined in a housing member, the width of said sealing cavity being essentially from 0.002 to 0.005 inch greater than the combined thickness of said plates, said housing member defining a central aperture, the central portions of said sliding plates being exposed through said aperture to the exterior of said housing member.

15. The valve system of claim 13 in which said arm means are connected to said first and second sliding plates at a central portion thereof, said arm means connecting with said sliding plates through the central aperture.

16. The valve system of claim 12 which further includes means for intermittently providing pressurized gas to the face of said first sliding member which is opposed to said second sliding plate and the combustion chamber, to further facilitate the motion of said sliding plates.

17. In a valve system for a motor and the like for controlling flow through a conduit, which valve comprises first and second sliding plates positioned together in facing, overlapping relationship, said first and second sliding plates each defining an aperture, said plates being movable between a first sliding position in which said apertures overlap together to define a flow path through said plates and a second sliding position in which said apertures are spaced from each other to prevent flow through said plates; said sliding plates being enclosed about their edges in a sealing cavity defined in a housing member, the width of said sealing cavity being essentially from 0.002 to 0.005 inch greater than the combined thickness of said plates, said housing member defining a central aperture, the central portions of said sliding plates being exposed through said aperture to the exterior of said housing member; arm means attached to said sliding plates, and means for reciprocating said arm means to reciprocate the plates between the first and second sliding positions, said arm means being connected to said first and second sliding plates at a central portion thereof, said arm means connecting with the sliding plates through the central aperture.

18. The motor of claim 17 in which said connection between the arm means and the sliding plates comprises stud means on each of said sliding plates and said arm means, and intermediate connector means between said arm means and sliding plates defining recesses to receive said stud means, to lock each plate in and its connected arm means against relative motion with respect to each other in the direction of motion between the first and second positions, but to permit relative motion between each plate and its connected arm means in the direction perpendicular to said plate faces.

19. The motor of claim 18 in which one of said sliding plates is made of graphited aluminum and the other of said plates is made of a lightweight steel alloy.

* * * * *